(12) United States Patent
Ramachandra Iyer (10) Patent No.: US 10,936,586 B2
(45) Date of Patent: Mar. 2, 2021

(54) METHOD AND SYSTEM FOR PROVIDING DOMAIN-SPECIFIC RESPONSE TO A USER QUERY

(71) Applicant: WIPRO LIMITED, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 318 days.

(21) Appl. No.: 15/873,920

(22) Filed: Jan. 18, 2018

(65) Prior Publication Data
US 2019/0163785 A1    May 30, 2019

(30) Foreign Application Priority Data
Nov. 29, 2017    (IN) .............................. 201741042824

(51) Int. Cl.
| | |
|---|---|
| *G06F 16/00* | (2019.01) |
| *G06F 16/2453* | (2019.01) |
| *G06F 16/242* | (2019.01) |
| *G06F 16/2458* | (2019.01) |
| *G06F 16/2457* | (2019.01) |
| *G06F 16/33* | (2019.01) |
| *G10L 15/26* | (2006.01) |

(52) U.S. Cl.
CPC ...... *G06F 16/24535* (2019.01); *G06F 16/243* (2019.01); *G06F 16/2462* (2019.01); *G06F 16/24575* (2019.01); *G06F 16/3334* (2019.01); *G10L 15/26* (2013.01)

(58) Field of Classification Search
CPC .............. G10L 15/26; G06F 16/24535; G06F 16/3334; G06F 16/2462; G06F 16/24575; G06F 16/243
See application file for complete search history.

(56) References Cited

U.S. PATENT DOCUMENTS

| | | | |
|---|---|---|---|
| 6,411,951 B1 * | 6/2002 | Galindo-Legaria | ......................... G06F 16/24539 |
| 7,630,959 B2 * | 12/2009 | Chang | ................. G06F 16/3322 |
| 8,332,226 B1 | 12/2012 | Rahim et al. | |
| 9,201,923 B2 | 12/2015 | Weng et al. | |
| 9,239,544 B2 | 1/2016 | Kwon et al. | |
| 2002/0103794 A1 * | 8/2002 | Chang | ................. G06F 16/3322 |

(Continued)

*Primary Examiner* — Shiow-Jy Fan
(74) *Attorney, Agent, or Firm* — Finnegan, Henderson, Farabow, Garrett & Dunner, LLP (57) ABSTRACT

Disclosed herein is method and system for providing domain-specific response to user query. The user query is split into one or more sub-queries and domain of each of the sub-queries is determined based on domain-specific keywords present in each of the sub-queries. One or more responses to each of the sub-queries is retrieved from corresponding Domain-specific Query Handlers (DQHs). Finally, each of the one or more responses are collated for providing the domain-specific query to the user. In an embodiment, the DQHs are hierarchically arranged based on their importance and relevance to the user query. Further, the resources are allocated to each of the DQHs based on their hierarchy, thereby optimally distributing the resources among the DQHs. In an embodiment, the method of present disclosure ensures completeness/sufficiency in the response, before collating the one or more responses and providing the domain-specific response to the user.

16 Claims, 5 Drawing Sheets

(56) References Cited

U.S. PATENT DOCUMENTS

| | | | |
|---|---|---|---|
| 2005/0010922 A1* | 1/2005 | Czajkowski | G06N 5/003 |
| | | | 718/102 |
| 2007/0078815 A1* | 4/2007 | Weng | G06F 16/3329 |
| 2011/0066618 A1* | 3/2011 | Sigurbjornsson | G06F 16/9535 |
| | | | 707/739 |
| 2011/0295836 A1* | 12/2011 | Bolsius | G06F 16/243 |
| | | | 707/714 |
| 2014/0136212 A1* | 5/2014 | Kwon | G10L 15/22 |
| | | | 704/275 |
| 2015/0039579 A1* | 2/2015 | Clark | G06F 16/9535 |
| | | | 707/706 |
| 2015/0179168 A1 | 6/2015 | Hakkani-Tur et al. | |
| 2015/0310005 A1* | 10/2015 | Ryger | G06F 16/93 |
| | | | 707/706 |
| 2018/0089312 A1* | 3/2018 | Pal | G06F 16/2471 |
| 2018/0349377 A1* | 12/2018 | Verma | G06N 5/022 |
| 2019/0050406 A1* | 2/2019 | Nguyen | G06Q 10/107 |

\* cited by examiner

METHOD AND SYSTEM FOR PROVIDING DOMAIN-SPECIFIC RESPONSE TO A USER QUERY

FIELD OF THE INVENTION

The present subject matter is generally related to generating automated responses and more particularly, but not exclusively, to a method and system for providing domain-specific response to a user query.

BACKGROUND

Presently, automated response generation systems or automated dialog systems are becoming popular in providing answers to user queries. Generally, the dialog systems have access to pre-populated databases and provide responses through an interactive dialog with the user. However, in order to support the interactive dialog with the user, the automated dialog systems must have access to a lot of data/information related to various questions being asked by the user. Since multiple dialog systems are run concurrently within an organization, it is necessary to store multiple copies of the data/information in each dialog system to effectively handle the user queries. However, storing multiple copies of the same data/information in each dialog system is a redundant exercise, and requires more resources.

In addition, one of the hidden problems in the existing dialog systems is allocation of resources such as, mirroring resources, to the dialog systems to support huge traffic of user queries. Also, the existing dialog systems do not make any distinction between a frequently used information and an infrequently used information while allocating the resources to process the user queries. Hence, in terms of allocation of the resources, even the rarely used data that maps to the infrequently asked questions also receives same privilege as that of a frequently used data.

SUMMARY

Disclosed herein is a method for providing domain-specific response to a user query. The method includes splitting, by a response generation system, the user query into one or more sub-queries. Upon splitting the user query, domain of each of the one or more sub-queries is determined based on one or more domain-specific keywords present in each of the one or more sub-queries. Further, one or more responses to each of the one or more sub-queries is retrieved from one or more Domain-specific Query Handlers (DQHs), associated with the response generation system, based on the domain of each of the one or more sub-queries. Each of the one or more DQHs are hierarchically arranged. Finally, the one or more responses received from the one or more DQHs are collated for providing the domain-specific response to the user query.

Further, the present disclosure relates to a response generation system for providing domain-specific response to a user query. The response generation system includes a processor and a memory. The memory is communicatively coupled to the processor and stores processor-executable instructions, which on execution, cause the processor to split the user query into one or more sub-queries. Upon splitting the user query, the instructions cause the processor to determine domain of each of the one or more sub-queries based on one or more domain-specific keywords present in each of the one or more sub-queries. Further, the instructions cause the processor to retrieve one or more responses to each of the one or more sub-queries from one or more Domain-specific Query Handlers (DQHs), associated with the response generation system, based on the domain. Each of the one or more DQHs are hierarchically arranged. Finally, the instructions cause the processor to collate the one or more responses received from the one or more DQHs to provide the domain-specific response to the user query.

Furthermore, the present disclosure relates to a non-transitory computer readable medium including instructions stored thereon that, when processed by at least one processor cause a response generation system to perform operations comprising splitting a user query into one or more sub-queries. Further, the instructions cause the response generation system to determine domain of each of the one or more sub-queries based on one or more domain-specific keywords present in each of the one or more sub-queries. Furthermore, the instructions cause the response generation system to retrieve one or more responses to each of the one or more sub-queries from one or more Domain-specific Query Handlers (DQHs), associated with the response generation system, based on the domain, wherein the domain-specific query handlers are hierarchically arranged. Finally, the instructions cause the response generation system to collate the one or more responses received from the one or more DQHs for providing the domain-specific response to the user query.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a response generation system for providing domain-specific response to a user query. More particularly, the present disclosure relates to a mechanism for rendering a domain-specific response to the user query by collating multiple responses received from one or more hierarchically arranged Domain-specific Query Handlers (DQHs) or dialog systems.

In an embodiment, each of the one or more DQHs are organized hierarchically based on a plurality of parameters such as availability of resources, network bandwidth, frequency of accessing the data/information and the like. Further, one or more resources are allocated to each of the one or more DQHs based on the hierarchy of each of the one or more DQHs. As an example, a DQH which stores most frequently used data/information may be allocated more number of resources, to enable the DQH to serve more number of user queries which require access to the most frequently used data/information. Thus, embodiments of the present disclosure ensure that, each of the one or more DQHs are optimally equipped with one or more resources that are necessary for handling the user queries. As a result of the optimal resource allocation, delays in responding to the user queries, which occurs due to unavailability of the resources, may be eliminated, thereby providing responses to the user queries at a faster rate.

In an embodiment, the method of present disclosure helps in reducing total time required for responding to a user query belonging to multiple domains, since the response generation system collates the responses retrieved from multiple DQHs and provides it to the user on a single window. Also, embodiments of the present disclosure include checking for completeness/sufficiency in the response, before providing the response to the user, thereby enhancing overall user experience. In an embodiment, the method of present disclosure generates domain-specific responses without building domain ontologies, and without using local databases. Hence, operational overhead on the response generation system may be reduced.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
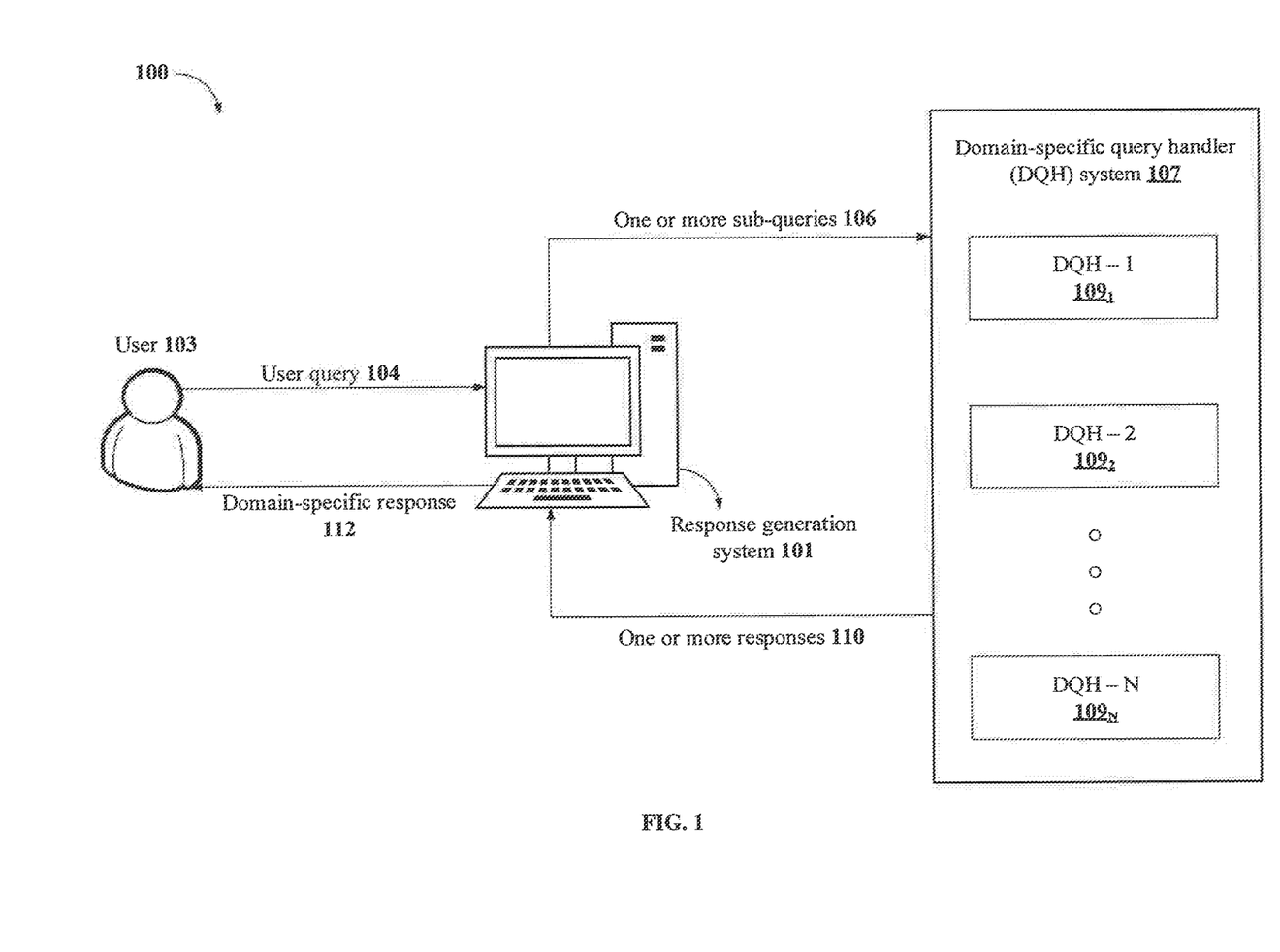
FIG. 1 illustrates an exemplary environment for providing domain-specific response to a user query in accordance with some embodiments of the present disclosure.

FIG. 1 illustrates an exemplary environment 100 for providing domain-specific response 112 to a user query 104 in accordance with some embodiments of the present disclosure.

The environment 100 includes a response generation system 101, a user 103 and a Domain-specific Query Handler (DQH) system 107. The response generation system 101 may be configured to interpret the user query 104, forward it to the DQH system 107, obtain corresponding responses from the DQH system 107 and then provide the responses to the user 103. In an embodiment, the response generation system 101 acts as an agent between the user 103 and the DQH system 107. In another embodiment, the response generation system 101 may be a centralized server, which is configured to store each of the one or more DQHs 109 and perform functionalities of the DQH system 107.

The DQH system 107 may include one or more DQHs 109, namely DQH-1, DQH-2, . . . DQH-N (collectively referred as one or more DQHs 109), which are hierarchically arranged. In an implementation, the DQH system 107 may be a centralized DQH system 107 and the response generation system 101 may access the DQH system 107 via wired and/or a wireless communication interface. Alternatively, the DQH system 107 may be configured locally, within the response generation system 101.

In an embodiment, each of the one or more DQHs 109 may be organized hierarchically based on a sorting weightage assigned to each of the one or more DQHs 109. The sorting weightage may be assigned based on one or more predetermined sorting parameters and predefined weightage associated with each of the one or more predetermined sorting parameters. As an example, the one or more predetermined sorting parameters may include, without limiting to, availability of system resources, bandwidth of network connecting the response generation system 101 and each of the one or more DQHs 109, frequency of accessing one or more queries stored in each of the DQHs, and degree of confidentiality of the user query 104. Further, each of the one or more DQHs 109 within the DQH system 107 may store data/information related to query/response of a specific domain. i.e., the data/information stored in one of the one or more DQHs 109 may be distinct from the data/information stored in other of the one or more DQHs 109.

In an embodiment, the response generation system 101 may receive the user query 104 from the user 103. Upon receiving the user query 104, the response generation system 101 may process the user query 104 using one or more natural language processing techniques such as, a speech-to-text conversion technique, configured in the response generation system 101. Further, the response generation system 101 may analyse the processed user query 104 to identify one or more sub-queries 106 in the user query 104. Thereafter, the response generation system 101 may split the user query 104 into the one or more sub-queries 106, before forwarding the user query 104 to the DQH system 107 for retrieving one or more responses 110 to the user query 104.

In an embodiment, the response generation system 101 may analyse each of the one or more sub-queries 106 to identify one or more domain-specific keywords in each of the one or more sub-queries 106. Further, the domain of each of the one or more sub-queries 106 may be determined based on the one or more domain-specific keywords present in each of the one or more sub-queries 106. As an example, various domains to which the one or more sub-queries 106 may belong includes, without limiting to, insurance, banking, robotics, automobiles, real-estate, medicine, education and the like. In an embodiment, when a single sub-query is determined to be belonging to multiple domains, a decision on the actual domain to which the sub-query should belong may be made based on one or more predefined domain identification rules configured in the response generation system 101. Therefore, the response generation system 101 ensures that, each of the one or more sub-queries 106 are categorized under a most relevant domain category, corresponding to the one or more domain-specific keywords present in each of the one or more sub-queries 106. Thus, the response generation system 101 helps in eliminating ambiguities while determining the domain of the one or more sub-queries 106, and thereby provides most relevant domain-specific response 112 to the user query 104.

In an embodiment, upon determining the domain of each of the one or more sub-queries 106, the response generation system 101 may forward each of the one or more sub-queries 106 to the one or more DQHs 109 in the DQH system 107 for retrieving one or more responses 110 from the one or more DQHs 109. The one or more DQHs 109 to which the one or more sub-queries 106 must be forwarded may be determined based on the domain of each of the one or more sub-queries 106. As an example, a sub-query which requires information about 'home treatment for viral fever', may be forwarded to one of the DQHs that has stored data/information related to 'medicine' or specifically, information related to 'treatment of viral fever'.

In an embodiment, upon retrieving the one or more responses 110 to each of the one or more sub-queries 106, the response generation system 101 collates each of the one or more responses 110 to generate a single domain-specific response 112 to the user query 104. As an example, each of the one or more responses 110, corresponding to each of the one or more sub-queries 106, may be arranged in an order of the one or more sub-queries 106 present in the user query 104. Further, the response generation system 101 may check for completeness/sufficiency in the domain-specific response 112 before providing the response to the user 103. As an example, the sufficiency of the domain-specific response 112 may be determined by mapping each of the one or more responses 110 with each of the corresponding one or more sub-queries 106 and verifying that responses for each of the one or more sub-queries 106 have been retrieved from the one or more DQHs 109.

In an embodiment, if the domain-specific response 112 is determined to be insufficient, the response generation system 101 may retrieve one or more missing and/or additional information from the one or more DQHs 109 before collating the one or more responses 110. However, if none of the DQHs have sufficient data/information required for answering the one or more sub-queries 106, the response generation system 101 may provide one or more alternative options to the user 103. As an example, the one or more alternative responses may include, a link to external reference materials/online repositories or contact details of one or more domain experts, who can provide required information to the user 103.

In an embodiment, the response generation system 101 may provide the domain-specific response 112 in various forms including, without limitation, audio, video, text and summary forms. Further, the response generation system 101 may determine the one or more forms in which the one or more DQHs 109 have to provide the one or more responses 110 based on the one or more predetermined sorting parameters associated with the one or more DQHs 109. As an example, the one or more predetermined sorting parameters may include, without limiting to, availability of system resources, bandwidth of network connecting the response generation system 101 and each of the one or more DQHs 109, frequency of accessing one or more queries stored in each of the DQHs, and degree of confidentiality of the one or more queries.

For example, when a DQH is overloaded in terms of number of sub-queries 106 being handled by the DQH, the response generation system 101 may instruct the DQH to provide one or more responses 110 in the text form, since the response in 'text' form consumes lesser network resources when compared to other forms of the response. Alternatively, when the DQH has enough resources, the response generation system 101 may instruct the DQH to provide the one or more responses 110 in the audio/video forms. Thus, the response generation system 101 ensures that the domain-specific response 112 is always provided in a most affordable form of representation, thereby enhancing overall user experience.

Figure 2:
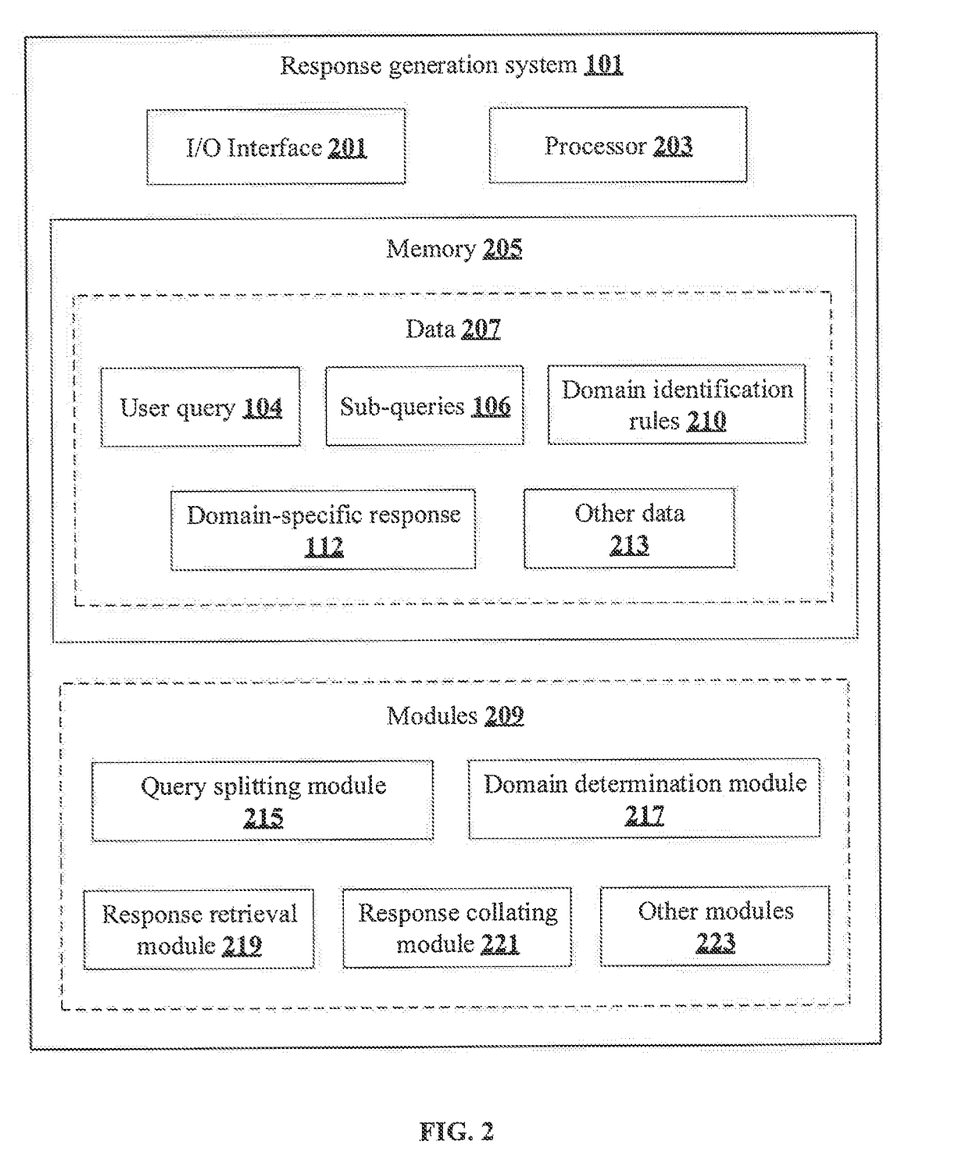
FIG. 2 shows a detailed block diagram illustrating a response generation system in accordance with some embodiments of the present disclosure.

FIG. 2 shows a detailed block diagram illustrating a response generation system 101 in accordance with some embodiments of the present disclosure.

The response generation system 101 may include an I/O interface 201, a processor 203, and a memory 205. The I/O interface 201 may be configured to communicate with the user 103, through one or more electronic devices associated with the user 103, to receive the user query 104 and to provide the domain-specific response 112 to the user 103. The memory 205 may be communicatively coupled to the processor 203. The processor 203 may be configured to perform one or more functions of the response generation system 101 for providing the domain-specific response 112 to the user 103.

In an embodiment, the electronic device (not shown in figures) associated with the user 103 may include a smartphone, a Personal Assistance Device (PDA) or a computing device, and may be used as an intermediate communication medium between the user 103 and the response generation system 101. The electronic device may receive the user query 104 from the user 103 and transmit it to the response generation system 101. Similarly, the electronic device may receive the domain-specific response 112 from the response generation system 101 and render it to the user 103 in a suitable form, as indicated by the response generation system 101. In an embodiment, the electronic device may be configured to perform each functionality of the response generation system 101 without deviating from the scope of the disclosure.

In some implementations, the response generation system 101 may include data 207 and modules 209 for performing various operations in accordance with the embodiments of the present disclosure. In an embodiment, the data 207 may be stored within the memory 205 and may include, without limiting to, the user query 104, one or more sub-queries 106, one or more domain identification rules 210, domain-specific response 112, and other data 213.

In an embodiment, the user query 104 may be received by the response generation system 101 from the user 103. As an example, the user query 104 may be received in one or more forms including, without limitation, text (e.g. e-mail communication), audio (pre-recorded voice), speech, narration and the like, through an electronic device associated with the user 103. In an embodiment, the user query 104 may be received as a single utterance word/sentence, or it may be a complex dialog involving multiple utterances. In addition to the user query, the data 207 may include one or more sub-queries. In an embodiment, the one or more sub-queries 106 are formed by the response generation system 101 by splitting the user query 104. Initially, the response generation system 101 may analyze the user query 104, which is in the form of natural language, using one or more Natural Language Processing (NLP) techniques to identify one or more distinct contexts in the user query 104. Thereafter, the response generation system 101 may split the user query 104 into the one or more sub-queries 106, such that, each of the one or more sub-queries 106 indicate distinct contexts of the user query 104. Further, the one or more sub-queries 106 may belong to one or more domains such as, banking insurance, healthcare, telecom and the like.

Moreover, the data 207 may include the one or more domain identification rules 210. The one or more domain identification rules 210 may be one or more predefined rules configured in the response generation system 101, which are used to identify the domain of each of the one or more sub-queries 106. In an embodiment, the one or more domain identification rules 210 may be used to determine the domain to which a sub-query must belong, when the sub-query appears to be belonging to plurality of the one or more domains.

For example, one of the domain identification rules 210 may be that—'a sub-query X, which appears to belong to both 'Insurance' and 'Banking' domains, must be categorized under the 'Banking' domain'. Accordingly, when the response generation system 101 encounters such a sub-query X, the response generation system 101 may forward the sub-query X to the Banking related DQH. In an embodiment, if the Banking related DQH does not provide complete response to the sub-query X, then the response generation system 101 may subsequently forward the sub-query X to the Insurance related DQH, to retrieve the required additional information, thereby generating a complete response to the sub-query X.

In an implementation, the data 207 may include the domain-specific response 112. The domain specific response may be provided to the user 103 in one or more forms including, text, summary, audio or video, depending on data format of the one or more responses 110 received from the one or more DQHs 109. Further, the data format in which each of the one or more responses 110 have to be received from the one or more DQHs 109 may be determined based on the one or more predetermined sorting parameters associated with the one or more DQHs 109. For example, bandwidth of a network, connecting the one or more DQHs 109 and the response generation system 101, may be considered as one of the predetermined sorting parameter for determining the data format in which the one or more responses 110 must be received from the one or more DQHs 109. In this scenario, if the one or more DQHs 109 have access to a network having limited/lesser bandwidth capabilities, then the one or more DQHs 109 may transmit the one or more responses 110 in a text and/or summary format, since the text/summary format of the response consumes minimal bandwidth. On the other hand, when the one or more DQHs 109 have access to a network with higher bandwidth capabilities, then the one or more DQHs 109 may transmit the one or more responses 110 in an image/video format, since the network has sufficient bandwidth to transmit the response in the image/video format.

In some embodiments, the data 207 may be stored within the memory 205 in the form of various data structures. Additionally, the data 207 may be organized using data models, such as relational or hierarchical data models. The other data 213 may store data, including temporary data and temporary files, generated by one or more modules 209 for performing various functions of the response generation system 101.

In an embodiment, each of the data 207 stored in the response generation system 101 may be processed by one or more modules 209 of the response generation system 101. In one implementation, the one or more modules 209 may be stored as a part of the processor 203. In another implementation, the one or more modules 209 may be communicatively coupled to the processor 203 for performing one or more functions of the response generation system 101. The modules 209 may include, without limiting to, a query splitting module 215, a domain determination module 217, a response retrieval module 219, a response collating module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the response generation system 101. It will be appreciated that such modules 209 may be represented as a single module or a combination of different modules.

In an embodiment, the query splitting module 215 may be responsible for splitting the user query 104 into one or more sub-queries 106. As an example, the query splitting module 215 may split the user query 104 by identifying one or more distinct contexts in the user query 104. In an embodiment, once the user query 104 is split into the one or more sub-queries 106, the one or more sub-queries 106 may be independent in nature such that, the context of each of the one or more sub-queries 106 is different from each other. Alternatively, the one or more sub-queries 106 may be inter-dependent in nature such that, the context of the one or more sub-queries are related. When the one or more sub-queries are inter-dependent in nature, the response to one of the one or more sub-queries 106 may be used as an input for retrieving the response to other sub-queries 106.

In an embodiment, the query splitting module 215 may determine the dependency among the one or more sub-queries 106, along with a sequence of processing each of the one or more sub-queries 106. As an example, the query splitting module 215 may determine the dependency among the one or more sub-queries 106 by comparing the one or more domain-specific keywords in each of the one or more sub-queries 106. In an embodiment, the query splitting module 215 may determine the sequence of processing the one or more sub-queries 106 based on order of utterance of the user query 104.

In an embodiment, after splitting the user query 104 into the one or more sub-queries 106, the domain determination module 217 may determine domain of each of the one or more sub-queries 106 based on the one or more domain-specific keywords present in each of the one or more sub-queries 106. In an embodiment, the domain determination module 217 may maintain a hierarchically sorted list of each of the one or more DQHs 109 available in the DQH system 107, along with the nature and domain of the data/information being stored in each of the one or more DQHs 109. Accordingly, the domain determination module 217 may map each of the one or more domain-specific keywords in each of the one or more sub-queries 106 with the hierarchically sorted list of the one or more DQHs 109 for identifying a most appropriate DQH, which belongs to the same domain as that of the sub-query, and is capable of handling the sub-query.

In an embodiment, the response retrieval module 219 may retrieve the one or more responses 110 to each of the one or more sub-queries 106 from the one or more DQHs 109. In an implementation, to keep track of each of the one or more responses 110 and to maintain a sequence of each of the one or more responses 110, the response retrieval module 219 may generate one or more slots for storing each of the one or more responses 110. Further, upon retrieving a response from one of the one or more DQHs 109, the response retrieval module 219 may analyse the retrieved response and move it to the one of the one or more slots, which has stored most relevant responses to the retrieved response.

For example, if an initial user query 104 is—'what is the EMI for house loan?', the corresponding response retrieved from the one or more DQHs 109, which is an EMI amount, would be stored in a slot named 'EMI'. Thereafter, the user 103 may ask a subsequent user query 104—"I am paying car EMI of Rs. 2,000 for 10 years. How much more should I pay for the same period, if I go for a house EMI also?". Here, the response to the subsequent user query 104, which is a sum of EMIs, would also be stored in the same/relevant slot. Consequently, the response retrieval module 219 ensures that each of the one or more responses 110 are stored in the order of their retrieval from the one or more DHQs 109, thereby maintaining a right sequence in the domain-specific response 112 provided to the user 103.

In an embodiment, the one or more responses 110 received from the one or more DQHs 109 may be generic responses since the one or more DQHs 109 may not have a specific response for the user query 104. As an example, consider a scenario where the user query 104—"My scooter, bought 8 years back for 10 years of payment, is stolen" is directed to the 'Insurance' DQH. In this case, the expected response is unknown, because it is not a query itself in the first place. However, in order to respond to the user 103, the 'Insurance' DQH may provide a monetary response, having a positive sentiment, in response to the user query 104. In the above scenario, the 'Insurance' DQH may estimate the insurance claim status and provide a response as—"there will be a reimbursement of Rs 10,000 as an insurance claim for the vehicle".

In an embodiment, the response to the user query 104 may be retrieved from more than one DQHs. i.e. the one or more DQHs 109 may store data/information which overlaps with the data/information stored on the other DQHs. For example, the 'Banking' DQH may also store some data/information that are related to the 'Insurance' DQH. In such instances, the response retrieval module 219 may apply the predefined domain identification rules 210 to select one of the one or more DQHs 109 from which the response has to be retrieved. Alternatively, an operator of the response generation system 101, or the user 103 himself may choose one of the one or more overlapping DQHs to retrieve a most appropriate response.

In the above scenario, the response retrieval module 219 maintains homogeneity of the one or more responses 110, by storing each of the one or more responses 110 in the corresponding one or more slots. Further, the response retrieval module 219 may adaptively employ appropriate hypothesis testing techniques, such as Bayesian network, to merge most relevant responses retrieved from multiple DQHs.

In an embodiment, merging of responses may also be based on majority in the nature of domain-specific keywords. For example, if there is a user query 104 indicating vehicle theft, it may be related to the fact that an insurance agency gives money in case of theft; if the user 103 gets money from the insurance agency, it can be paid as down payment to bank; if there is a down payment, the EMI would reduce. Hence, the user queries relating to the above sequence of logic may be merged and handled by a 'Banking' DQH alone.

In an embodiment, the response collating module 221 may be responsible for collating each of the one or more responses 110 retrieved from each of the one or more DQHs 109 into the domain-specific response 112. Additionally, the response collating module 221 may be responsible for checking the completeness or sufficiency of the domain-specific response 112, before providing the domain-specific response 112 to the user 103.

In an embodiment, the response collating module 221 may verify sufficiency in the one or more responses 110 by filling each of the one or more responses 110 into the corresponding one or more slots and then mapping each of the one or more slots with the corresponding one or more sub-queries 106. As an example, the insufficiency in the one or more responses 110 may be detected when there is no response in the one or more slots corresponding to the one or more sub-queries 106. Further, the response collating module 221 may also determine the one or more responses 110 to be insufficient when the one or more responses 110 are not relevant to the one or more sub-queries 106.

For example, if a query is about loan, then the corresponding response must have data/information related to the loan. However, if the response includes information related to other irrelevant domains, such as entertainment, then the response is determined to be insufficient. In an embodiment, the response collating module 221 may query the one or more DQHs 109 for receiving one or more additional and/or missing responses to the one or more sub-queries 106, when the one or more responses 110 are determined insufficient.

In an embodiment, the response collating module 221 collates each of the one or more responses 110 into the domain-specific response 112 upon determining the sufficiency in each of the one or more responses 110. Further, the response collating module 221 may perform smoothening of the domain-specific response 112, before it is provided to the user 103. As an example, the smoothening operation may be performed using a Natural Language Generation (NLG) technique configured in the response collating module 221.

EXEMPLARY EMBODIMENT

As an example, consider a user query 104—"My scooter, bought 8 years back, for 10 years of payment, is stolen. Is there any reduction in the EMI that I need to pay?".

Here, upon analyzing a first part of the user query 104—"My scooter, bought 8 years back, for 10 years of payment, is stolen", the response generation system 101 may identify keywords such as—'scooter', 'stolen', '8 years', '10 years', and 'payment'. Based on the identified keywords, the response generation system 101 may determine that the first part of the user query 104—"My scooter, bought 8 years back, for 10 years of payment, is stolen" is related to 'stealing of vehicle'.

Similarly, upon analyzing second part of the user query 104—"Is there any reduction in the EMI that I need to pay?", the response generation system 101 may identify keywords such as, 'reduction of EMI', 'pay'. Based on these keywords, the response generation system 101 may determine that the second part of the user query 104 is related to 'reduction in EMI payment'.

Based on the above analysis, the response generation system 101 may split the user query 104 into two sub-queries 106 as indicated below:

Sub-query 1: "My scooter, bought 8 years back, for 10 years of payment, is stolen"

Sub-query 2: "Is there any reduction in the EMI that I need to pay?"

Further, the response generation system 101 may determine the domain of the Sub-query 1 and Sub-query 2, based on the one or more keywords identified in the Sub-query 1 and Sub-query 2 respectively. Accordingly, the Sub-query 1 may be determined to be belonging to 'Insurance' or 'Public law' domain, since it is related to 'stealing of the vehicle'. Similarly, the Sub-query 2 may be determined to be belonging to 'Banking' domain, since it is related to 'reduction in EMI'.

Upon determining the domain of each of the two sub-queries, the one or more responses 110 to each of the two sub-queries may be retrieved from one or more hierarchically arranged DQHs 109 that have stored information related to the domain of the sub-queries. In the above example, the response to the Sub-query 1 may be retrieved by forwarding the Sub-query 1 to one of the one or more DQHs 109 that has stored data/information related to 'Insurance' or 'Public law', as the domain of the Sub-query 1 is determined to be 'Insurance' or 'Public law'. Similarly, the response to the Sub-query 2 may be retrieved by forwarding the Sub-query 2 to one of the one or more DQHs 109 that has stored data/information related to 'Banking' since the domain of the Sub-query 2 is determined to be 'Banking'.

For example, the response to the Sub-query 1, retrieved from the Banking DQH, may be—"there will be a reimbursement of Rs 10,000 as an insurance claim for the vehicle". Similarly, the response to the Sub-query 2, retrieved from the Insurance/Public law DQH may be—"EMI for rest of the 2 years would be reduced to Rs. 981".

Finally, the one or more responses 110 retrieved for each of the one or more sub-queries may be collated to form a single domain specific response 112 to the user query 104. In the given example, the responses corresponding to the Sub-query 1 and the Sub-query 2 may be collated into the domain-specific response 112 as—"There will be a reimbursement of Rs 10,000 as an insurance claim for the vehicle. Therefore, reduced EMI for rest of the 2 years would be Rs. 981". Subsequently, the domain-specific response 112, thus obtained, may be provided to the user, as a response to the user query 104.

Figure 3:
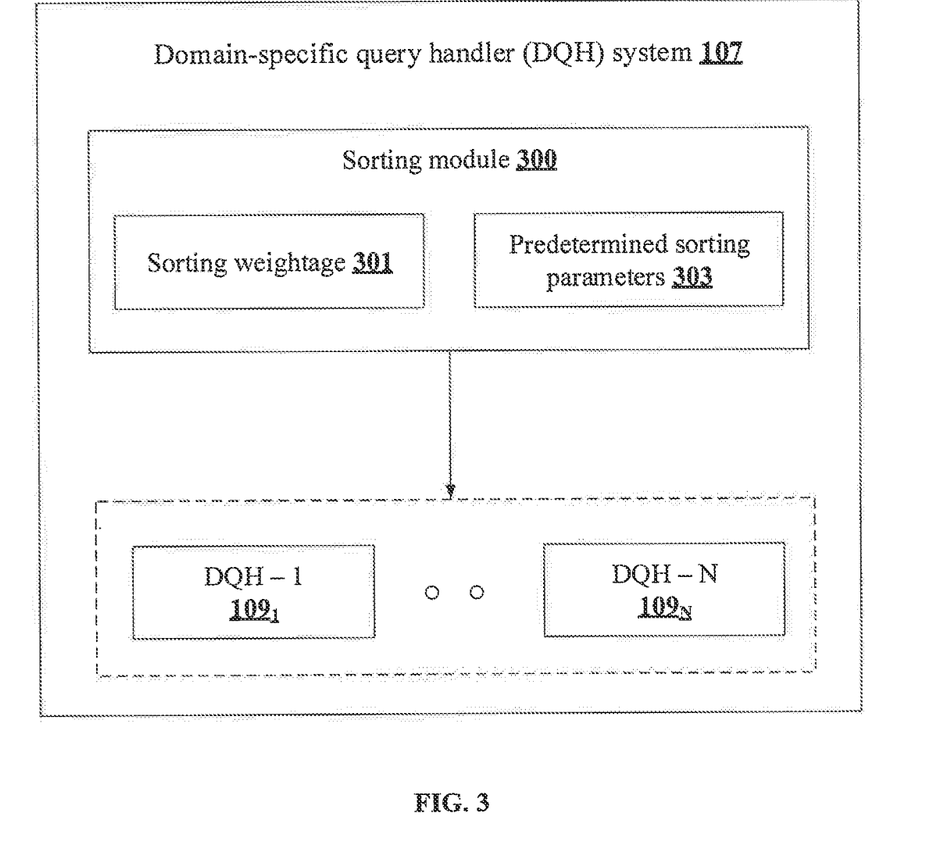
FIG. 3 illustrates a detailed block diagram of a domain-specific query handler (DQH) system in accordance with some embodiments of the present disclosure.

FIG. 3 illustrates a detailed block diagram of a Domain-specific Query Handler (DQH) system 107 in accordance with some embodiments of the present disclosure.

In an embodiment, the DQH system 107 may include one or more hierarchically organized domain-specific query handlers (DQHs) 109 or expert question-answer systems that store data/information related to a specific domain. As an example, the one or more DQHs 109 may include, without limiting to, a banking query handler, an insurance query handler, an education query handler, an entertainment query handler and the like. In an implementation, each of the one or more DQHs 109 are capable of operating independently as separate dialog handler systems through predetermined Application Programming Interfaces (APIs) associated with each of the one or more DQHs 109.

In an embodiment, the DQH system 107 may include a sorting module 300, which is used for assigning a sorting weightage 301 to each of the one or more DQHs 109 to hierarchically arrange each of the one or more DQHs 109 based on one or more predetermined sorting parameters 303. As an example, the one or more predetermined sorting parameters 303 may include, without limiting to, availability of system resources at each of the one or more DQHs 109, bandwidth of network connecting the response generation system 101 and each of the one or more DQHs 109, frequency of accessing data/information stored in each of the one or more DQHs 109, and degree of confidentiality in the data/information stored in each of the one or more DQHs 109.

In an embodiment, the process of assigning sorting weightage 301 to each of the one or more DHQs 109 and organizing each of the one or more DHQs 109 based on their sorting weightage 301 may be an offline activity. Further, each of the one or more DQHs 109 may be evaluated and organized at periodic intervals.

In an embodiment, the one or more DQHs 109 having stored most frequently accessed data/information are given higher sorting weightage 301 and are assigned with higher resources, more number of mirrored Universal Resource Locators (URLs), greater network bandwidth and the like to support scalability of the user queries. Thus, while allocating the one or more resources (as stated above) to each of the one or more DQHs 109, it is ensured that, each of the one or more DQHs 109 are allocated with sufficient resources that are necessary for handling expected number of user queries. As a result of optimal resource allocation, delays in responding to the user queries, which occurs due to unavailability and/or lack of the resources, may be eliminated, thereby providing responses to the user queries at a faster rate.

In an embodiment, a substantive portion of each of the one or more DQHs 109 may be used to store distinct domain-specific data, whereas a small part of the DQHs is used for storing data that overlaps and/or is common to DQHs of other domains. Further, when a new data/information must be entered and stored in the one or more DQHs 109, the one or more DQHs 109, to which the new data/information has to be entered is determined based on the domain of the new data/information. The domain of the new data/information may be detected through the one or more domain-specific keywords present in the data. In an embodiment, the one or more domain-specific keywords of the data may match with more than one DQHs. In such scenarios, one of the one or more DQHs 109 to be selected for storing the data may be decided based on a domain weightage assigned to each of the one or more DQHs 109.

As an example, the domain weightage for each of the one or more DQHs 109 may be calculated using equation (1) below:

$$\text{Domain weightage} = W1^*(\text{Number of domain-specific keywords}) + W2^*(\text{Query context}) \quad (1)$$

Here, the 'Number of domain-specific keywords' indicates the total number of domain-specific keywords present in the data/information to be stored in a specific DQH. Further, the 'Query context' indicates the number of times, the same/similar data is mapped to a DQH. The parameters 'W1' and 'W2' are constant weight factors, that indicate weightage and/or importance of each of the one or more parameters used for estimating the domain weightage. As an example, value of parameter 'W1' may be 0.4 and the value of parameter 'W2' may be 0.6, which means that, a higher importance is given to the context of the query than the number of domain-specific keywords, while assigning the domain weightage to the one or more DQHs 109. Finally, one of the one or more DQHs 109 having highest domain weightage is selected for storing the new data/information.

In an embodiment, once the domain of the new data/information is determined, the newly added data/information may be stored hierarchically within the corresponding DQH. Sorting of the data is essential for providing the response in various forms including, a detailed response, a short response, and the like especially when the requested response is lengthy. As an example, in a first level of response, only an abstract information about the response may be made available for retrieval. In the second level a few key sentences, having key phrases or summarized sentences may be provided. In the subsequent levels, a more detailed information may be provided in the form of images, audios and videos. For example, while responding to a user query 104 that requires assistance on fixing a cartridge to a printer, the abstract level of response may be the list of steps, followed by a detailed response in the form of summarized sentences. A further detailed response may include pictorial representations and video demos for fixing the cartridge. In an embodiment, the user 103 himself may be given options to select the level and/or amount of details required in the domain-specific response 112.

In an embodiment, the sorting weightage 301 for each of the one or more DQHs 109 may be estimated based on the one or more predetermined sorting parameters 303 and the weightage factors assigned to each of the one or more predetermined parameters. The sorting weightage 301 may be determined based on the nature and importance of the data/information stored in the one or more DQHs 109. As an example, the sorting weightage 301 of a DQH may be calculated using equation (2) below:

Sorting weightage=$W1$*(Frequency of accessing the information)+$W2$*(Sensitivity of the information) (2)

Wherein, the constant weight factors 'W1' and 'W2' indicate the weightage and/or importance of each of the one or more sorting parameters used for assigning the sorting weightage 301. As an example, value of weight factor 'W1' may be 0.5 and value of the weight factor 'W2' may be 0.4, which indicates that, the frequency of accessing the information plays a significant role in assigning the sorting weightage 301 to each of the one or more DQHs 109. Finally, each of the one or more DQHs 109 may be hierarchically sorted based on the sorting weightage 301.

During resource allocation, the one or more DQHs 109 having higher hierarchy may be allocated with higher number of resources, thereby enabling the one or more DQH having higher hierarchy to handle high traffic of user queries. In an embodiment, although a lesser number of resources are allocated to the one or more DQHs 109 having lower hierarchy, the one or more DQHs 109 at the lower hierarchy would still be allocated with sufficient resources to effectively handle the user queries.

Figure 4:
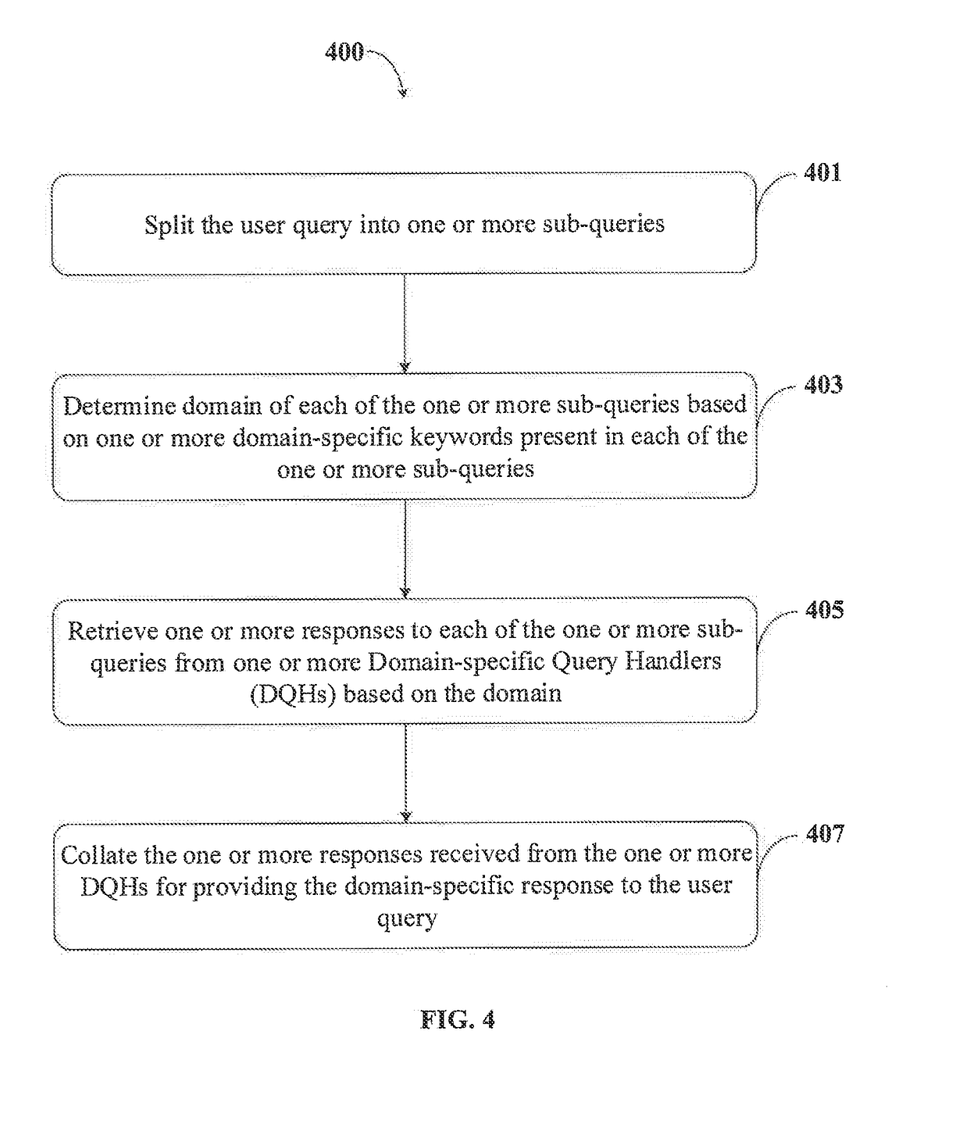
FIG. 4 shows a flowchart illustrating a method for providing domain-specific response to user queries in accordance with some embodiments of the present disclosure.

FIG. 4 shows a flowchart illustrating a method for providing domain-specific response 112 to a user query 104 in accordance with some embodiments of the present disclosure.

As illustrated in FIG. 4, the method 400 includes one or more blocks illustrating a method for providing the domain-specific response 112 to the user query 104 using a response generation system 101, for example the response generation system 101 shown in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 includes splitting, by the response generation system 101, the user query 104 into one or more sub-queries 106. In an embodiment, the user query 104 may be split into the one or more sub-queries 106 by analyzing the user query 104 using one or more natural processing techniques.

At block 403, the method 400 includes determining, by the response generation system 101 domain of each of the one or more sub-queries 106 based on one or more domain-specific keywords present in each of the one or more sub-queries 106. In an embodiment, when the one or more domain-specific keywords present in each of the one or more sub-queries 106 belong to plurality of domains, the domain of each of the one or more sub-queries 106 may be determined based on predefined domain identification rules 210 configured in the response generation system 101.

At block 405, the method 400 includes retrieving, by the response generation system 101, one or more responses 110 to each of the one or more sub-queries 106 from one or more Domain-specific Query Handlers (DQHs) 109 based on the domain of each of the one or more sub-queries 106. The one or more DQHs 109 may be associated with the response generation system 101. In an embodiment, each of the one or more DQHs 109 may be hierarchically arranged based on a sorting weightage 301 assigned to each of the one or more DQHs 109.

As an example, the sorting weightage 301 may be assigned based on one or more predetermined sorting parameters 303 and predefined weightage associated with each of the one or more predetermined sorting parameters 303. The one or more predetermined sorting parameters 303 may include, without limiting to, availability of system resources, bandwidth of network connecting the response generation system 101 and each of the one or more DQHs 109, frequency of accessing one or more queries stored in each of the DQHs, and degree of confidentiality of the one or more queries.

At block 407, the method 400 includes collating, by the response generation system 101, the one or more responses 110 received from the one or more DQHs 109 for providing the domain-specific response 112 to the user query 104. In an embodiment, each of the one or more responses 110 may be collated upon determining the sufficiency in each of the one or more responses 110.

In an embodiment, the response generation system 101 may determine sufficiency in each of the one or more responses 110 by mapping each of the one or more responses 110 with corresponding one or more sub-queries 106. Further, the response generation system 101 may query the one or more DQHs 109 for receiving one or more additional responses to the one or more sub-queries 106, when the one or more responses 110 are determined insufficient.

In an embodiment, the response generation system 101 may determine one or more forms in which the one or more DQHs 109 have to provide the one or more responses 110 based on the one or more predetermined sorting parameters 303 associated with the one or more DQHs 109. As an example, the one or more forms are at least one of audio, video, text, and summary.

Computer System

Figure 5:
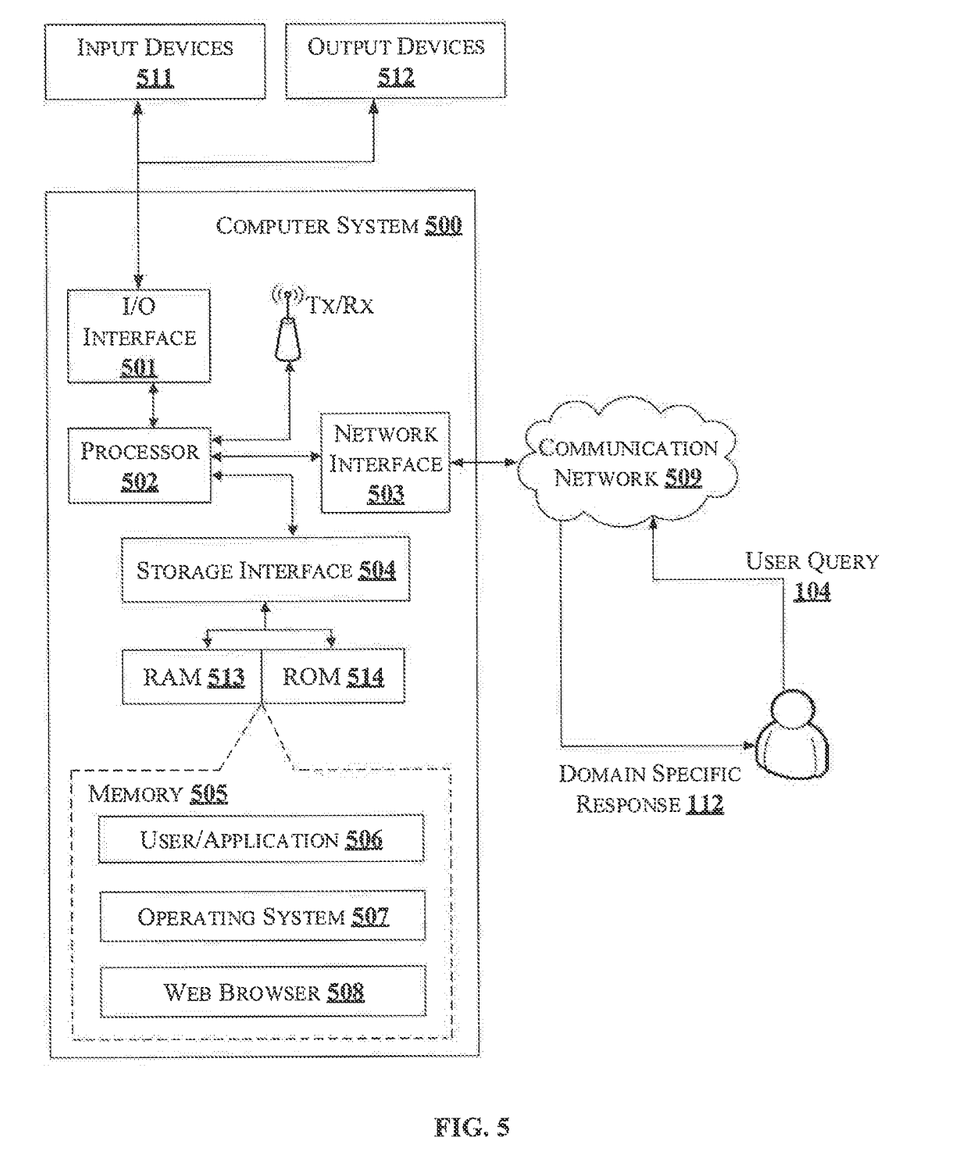
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be response generation system 101, which is used for providing domain-specific response 112 to user query 104. The computer system 500 may include a central processing unit ("CPU" or "processor") 502. The processor 502 may comprise at least one data processor for executing program components for executing user- or system-generated business processes. A user 103 may include a person, a user 103 in the computing environment 100, a user 103 querying the response generation system 101, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to a user device, such as a smartphone, a laptop, or a desktop computer associated with the user 103, through which the user 103 interacts with the response generation system 101.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control ProtocoVlInternet Protocol (TCP/IP), token ring, IEEE 802.11a/b/g/n/x, etc. Using the network interface 503 and the communication network 509, the computer system 500 may communicate with the user 103 to receive the user query 104, and to provide the domain-specific response 112.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), Free-BSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure discloses an automated method for generating domain-specific responses to a user query.

In an embodiment, the method of present disclosure provides domain-specific response to the user query on a single window, even when the user query includes multiple sub-queries, belonging to multiple domains.

In an embodiment, the method of present disclosure hierarchically arranges each of the one or more Domain-specific Query Handlers (DHHs), used for retrieving responses to the user query, based on importance and relevance of each of the DQHs to the user queries. Further, one or more resources are assigned to each of the DQHs based on their hierarchy, thereby efficiently managing the resource allocation.

In an embodiment, the method of present disclosure helps in eliminating redundancy/duplication in resource allocation by optimally distributing the resources among the one or more DQHs based on their hierarchy.

In an embodiment, the method of present disclosure reduces total time required for responding to a user query belonging to multiple domains, since the response generation system collates the responses retrieved from multiple DQHs and provides it to the user on a single window.

In an embodiment, the method of present disclosure is capable of checking completeness/sufficiency in the response, before providing the response to the user, thereby enhancing overall user experience.

In an embodiment, the method of present disclosure generates domain-specific responses without building domain ontologies, and without storing local databases. Hence, operational overhead on the response generation system is reduced.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Response generation system |
| 103 | User |
| 104 | User query |
| 106 | Sub-queries |
| 107 | Domain-specific Query Handler (DQH) system |
| 109 | Domain-specific Query Handlers (DQHs) |
| 110 | One or more responses to sub-queries |
| 112 | Domain-specific response |
| 201 | I/O interface |
| 203 | Processor |
| 205 | Memory |
| 207 | Data |
| 209 | Modules |
| 210 | Domain identification rules |
| 213 | Other data |
| 215 | Query splitting module |
| 217 | Domain determination module |
| 219 | Response retrieval module |
| 221 | Response collating module |
| 223 | Other modules |
| 300 | Sorting module |
| 301 | Sorting weightage |
| 303 | Predetermined sorting parameters |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |

What is claimed is:

1. A method for providing domain-specific response to a user query, the method comprising:

splitting, by a response generation system, the user query into one or more sub-queries;

determining, by the response generation system, domain of each of the one or more sub-queries based on one or more domain-specific keywords present in each of the one or more sub-queries;

retrieving, by the response generation system, one or more responses to each of the one or more sub-queries from one or more Domain-specific Query Handlers (DQHs), associated with the response generation system, based on the domain, wherein the one or more domain-specific query handlers are hierarchically arranged based on a sorting weightage assigned to each of the one or more DQHs;

wherein the sorting weightage is assigned based on one or more predetermined sorting parameters and predefined weightage associated with each of the one or more predetermined sorting parameters;

selecting, by the response generation system, the one of the one or more DQHs when the one or more domain-specific keywords of data match with more than one DQHs is based on a domain weightage assigned to each of the one or more DQHs, wherein the domain weightage for each of the one or more DQHs is calculated based on number of domain-specific keywords and query context;

merging, by the response generation system, relevant responses retrieved from the one or more DQHs based on Bayesian network; and collating, by the response generation system, the one or more responses received from the one or more DQHs for providing the domain-specific response to the user query.

2. The method as claimed in claim 1, wherein the domain of each of the one or more sub-queries is determined based on predefined domain identification rules, configured in the response generation system, when the one or more domain-specific keywords present in each of the one or more sub-queries belong to plurality of domains.

3. The method as claimed in claim 1, wherein the one or more predetermined sorting parameters comprises availability of system resources, bandwidth of network connecting the response generation system and each of the one or more DQHs, frequency of accessing one or more queries stored in each of the DQHs, and degree of confidentiality of the one or more queries.

4. The method as claimed in claim 1 further comprises determining sufficiency in each of the one or more responses by mapping each of the one or more responses with corresponding one or more sub-queries.

5. The method as claimed in claim 4, wherein each of the one or more responses are collated upon determining the sufficiency in each of the one or more responses.

6. The method as claimed in claim 1 further comprises querying the one or more DQHs for receiving one or more additional responses to the one or more sub-queries, when the one or more responses are determined insufficient.

7. The method as claimed in claim 1 further comprises determining one or more forms in which the one or more DQHs have to provide the one or more responses based on the one or more predetermined sorting parameters associated with the one or more DQHs.

8. The method as claimed in claim 7, wherein the one or more forms are at least one of audio, video, text, and summary.

9. A response generation system for providing domain-specific response to a user query, the response generation system comprising:

a processor; and a memory, communicatively coupled to the processor, wherein the memory stores processor-executable instructions, which on execution, cause the processor to:

split the user query into one or more sub-queries;

determine domain of each of the one or more sub-queries based on one or more domain-specific keywords present in each of the one or more sub-queries;

retrieve one or more responses to each of the one or more sub-queries from one or more Domain-specific Query Handlers (DQHs), associated with the response generation system, based on the domain, wherein the one or more domain-specific query handlers are hierarchically arranged based on a sorting weightage assigned to each of the one or more DQHs;

wherein the sorting weightage is assigned based on one or more predetermined sorting parameters and predefined weightage associated with each of the one or more predetermined sorting parameters;

select the one of the one or more DQHs when the one or more domain-specific keywords of data match with more than one DQHs is based on a domain weightage assigned to each of the one or more DQHs, wherein the domain weightage for each of the one or more DQHs is calculated based on number of domain-specific keywords and query context;

merge relevant responses retrieved from the one or more DQHs based on Bayesian network; and collate the one or more responses received from the one or more DQHs to provide the domain-specific response to the user query.

10. The response generation system as claimed in claim 9, wherein the instructions cause the processor to determine domain of each of the one or more sub-queries based on predefined domain identification rules configured in the response generation system, when the one or more domain-specific keywords present in each of the one or more sub-queries belong to plurality of domains.

11. The response generation system as claimed in claim 9, wherein the one or more predetermined sorting parameters comprises availability of system resources, bandwidth of network connecting the response generation system and each of the one or more DQHs, frequency of accessing one or more queries stored in each of the DQHs, and degree of confidentiality of the one or more queries.

12. The response generation system as claimed in claim 9, wherein the instructions further cause the processor to determine sufficiency in each of the one or more responses by mapping each of the one or more responses with corresponding one or more sub-queries.

13. The response generation system as claimed in claim 12, wherein the instructions cause the processor to collate each of the one or more responses upon determining the sufficiency in each of the one or more responses.

14. The response generation system as claimed in claim 9, wherein the instructions further cause the processor to query the one or more DQHs to receive one or more additional responses to the one or more sub-queries, when the one or more responses are determined insufficient.

15. The response generation system as claimed in claim 9, wherein the instructions further cause the processor to determine one or more forms in which the one or more DQHs have to provide the one or more responses, based on the one or more predetermined sorting parameters associated with the one or more DQHs.

16. A non-transitory computer readable medium including instructions stored thereon that, when processed by at least one processor cause a response generation system to perform operations comprising:

splitting the user query into one or more sub-queries;

determining domain of each of the one or more sub-queries based on one or more domain-specific keywords present in each of the one or more sub-queries;

retrieving one or more responses to each of the one or more sub-queries from one or more Domain-specific Query Handlers (DQHs), associated with the response generation system, based on the domain,         wherein the one or more domain-specific query handlers are hierarchically arranged based on a sorting weightage assigned to each of the one or more DQHs;

wherein the sorting weightage is assigned based on one or more predetermined sorting parameters and predefined weightage associated with each of the one or more predetermined sorting parameters;

selecting the one of the one or more DQHs when the one or more domain-specific keywords of data match with more than one DQHs is based on a domain weightage assigned to each of the one or more DQHs, wherein the domain weightage for each of the one or more DQHs is calculated based on number of domain-specific keywords and query context;

merging relevant responses retrieved from the one or more DQHs based on Bayesian network; and     collating the one or more responses received from the one or more DQHs for providing the domain-specific response to the user query.

\* \* \* \* \*